May 26, 1942.　　　O. SCHMITZ　　　2,284,594
AIR AND WATER-TIGHT WATCH STEM
Filed April 16, 1941
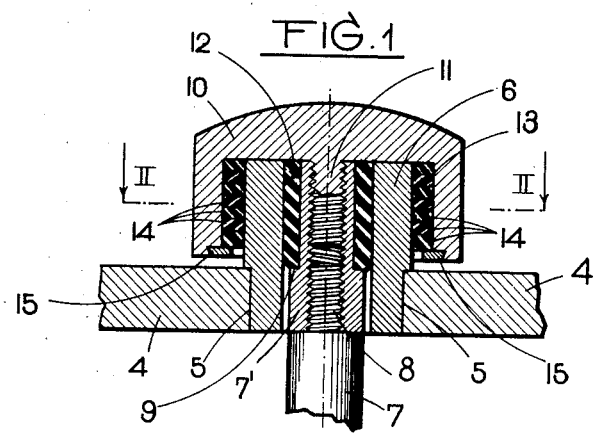
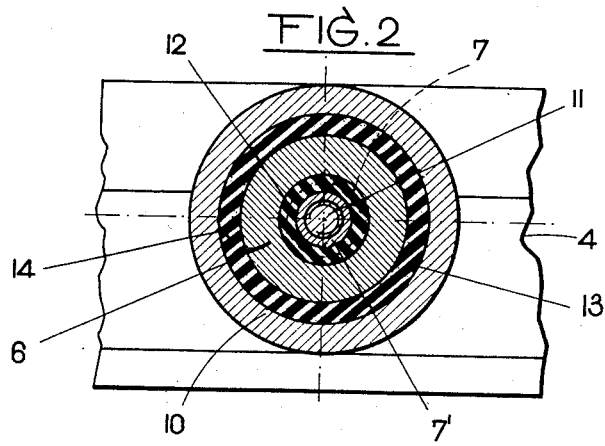
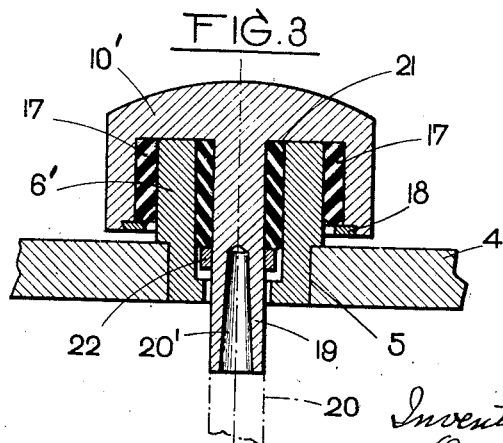
Inventor
O. Schmitz
By E. F. Wenderoth
Atty.

Patented May 26, 1942

2,284,594

UNITED STATES PATENT OFFICE 2,284,594

AIR AND WATER TIGHT WATCH STEM

Otto Schmitz, Grenchen, Switzerland

Application April 16, 1941, Serial No. 388,887
In Switzerland May 20, 1940

1 Claim. (Cl. 58—90)

It is an object of the present invention to provide an air and water-tight watch stem for watches of various kinds in which a hollow crown adjustably fixed with relation to the stem cooperates with a tube fixed to the casing and in which tube the stem has free play.

A further object of the invention is to provide a tubular element fixed to the watch casing in which the stem has free passage and assembled therewith various elements which are designed to prevent water and dust from penetrating to the interior of the casing through such tubular element.

A further object of the invention is to provide a construction in which there is an air and water-tight stem assemblage and in which the stem and the crown therefor have a certain lateral elastic play to facilitate adjustment of the stem and also prevent any accidental breaking thereof as far as possible when it is subjected to quite strong lateral tension, as for example, when manually manipulated to move the stem to setting position. In order to accomplish such purpose a water-tight packing of compressible material, such as a rubber sleeve, is inserted and compressed between the stem and the tubular element provided upon the watch casing and such a packing may be supported between a shoulder provided upon the stem or an element cooperating with the stem and the bottom of the crown cavity.

With the above and other objects which will become apparent from the detailed description below, the invention is shown in the drawing in which:

Figure 1 is a central vertical sectional view illustrating one form of the invention.

Figure 2 is a horizontal sectional view taken upon the section line II—II of Figure 1.

Figure 3 is a similar sectional view of a modified construction.

Referring to Figures 1 and 2 in which like parts are indicated by like reference characters, the casing 4 is provided with a round hole 5 in which is driven or soldered a cylindrical tubular element 6. Such tubular element 6 has an interior diameter which is sufficient to provide free passage for the stem 7. Cooperating with the threaded stud 8 provided on the stem 7 is a coupling socket 7' which is interiorly threaded, as shown. The coupling socket 7' is also provided with a shoulder 9 for a purpose described below.

The hollow crown 10 for the stem is provided with a threaded stud 11 integral with the crown and such stud 11 is designed to be threaded into the interiorly tapped portion of the socket 7' when the crown 10 has been properly adjusted upon the tubular element 6.

A compressible air-tight sleeve 12 is positioned between the interior surface of the element 6 and the exterior surface of the coupling socket 7', as shown, and such sleeve may be constructed of rubber. The sleeve 12 bears at one end against the shoulder 9 of the coupling socket and at the other end against the bottom of the crown cavity.

When the crown 10 and the stem 7 have been threaded into the coupling socket 7' the sleeve 12 which is of greater length in its free state than the distance between the shoulder 9 and the inside of the socket 10, is compressed and forms a tight fit between the tubular element 6 and the coupling socket so that water and dust will be prevented from penetrating to the interior of the watch casing 4.

Furthermore, an air-tight packing which is formed of compressible washers 14 is located in the annular space 13 which separates the exterior surface of the tubular element 6 from the interior surface of the apron upon the crown 10. These washers 14 are preferably constructed of a material which is impermeable to water and dust such as, for example, rubber. The washers 14 are superimposed upon one another in the manner shown, particularly in Figure 1, and are maintained in a compressed state by means of a retaining ring 15 inserted into a groove provided upon the lower edge of the apron of the crown 10. The washers 14 form an auxiliary packing which also prevents the water and dust from entering the casing 4 and indeed prevents the water and dust from even arriving at the opening of the tubular element 6. The retaining ring 15 is preferably made removable so that it may be removed from the groove provided in the crown and the washers 14 then removed and replaced by others.

The air and water tightness of the stem with relation to the watch casing, is also assured by the packings 12 and 14 when the crown 10 has been withdrawn from the casing in order to move the stem to setting position because these packings never become disengaged from either side of the tubular element 6. In other words, the packings engage both sides of the tube 6 regardless of whether the stem is in winding or setting position.

In the modification shown in Figure 3, the construction is substantially the same as the construction above described. In this modification the casing is indicated at 4 and a tubular element 6' is fixed in the round hole 5 provided in the casing 4. The hollow crown 10' is adjustably fitted against the exterior end of the tubular element 6' and a packing 17 of compressible material which is impermeable to water and dust is located in the annular space between the exterior surface of the tube 6' and the interior surface of the apron of the crown. A retaining ring 18 similar to the ring 15 is positioned in the edge of the crown 10' to retain the packing 17.

In this modification the stem 20 is provided with a conical end 20' which fits by hard friction in a correspondingly shaped bore provided in an extension 19 extending from the crown 10'.

Between the interior surface of the tubular element 6' and the exterior surface of the element 19 of the crown there is inserted an air and water-tight sleeve 21 of compressible material. The sleeve 21 is maintained in compressed state between the bottom of the cavity in the crown and a retaining ring 22 sweated or otherwise fixed forcibly upon the member 19. The ring 22 forms a shoulder which takes the place of the shoulder 9 provided upon the coupling socket 7' of the first species described above. The operation of this second species is exactly the same as with respect to the first species described above and in this species also the air and water-tightness of the stem with relation to the casing is maintained regardless of whether the stem is in winding or setting position.

I claim:

An air and water-tight stem construction for watches comprising a watch casing having an opening therein and adapted to receive a watch movement, a stem for said movement, a tubular element fixed to said casing at said opening receiving said stem freely, a coupling socket secured to said stem also received freely in said tubular element, a hollow crown for said stem, a stud provided upon said hollow crown also secured to said coupling socket, said coupling socket having a shoulder thereon and an air and water-tight packing of compressible material compressed between said shoulder upon said coupling socket and the bottom of the crown cavity.

OTTO SCHMITZ.